Sept. 12, 1967 C. N. KIMBERLIN, JR., ET AL 3,341,282
DEHYDRATION MAGNESIUM CHLORIDE UTILIZING
ALCOHOL SOLUTION AND AMMONIA
Filed April 14, 1965
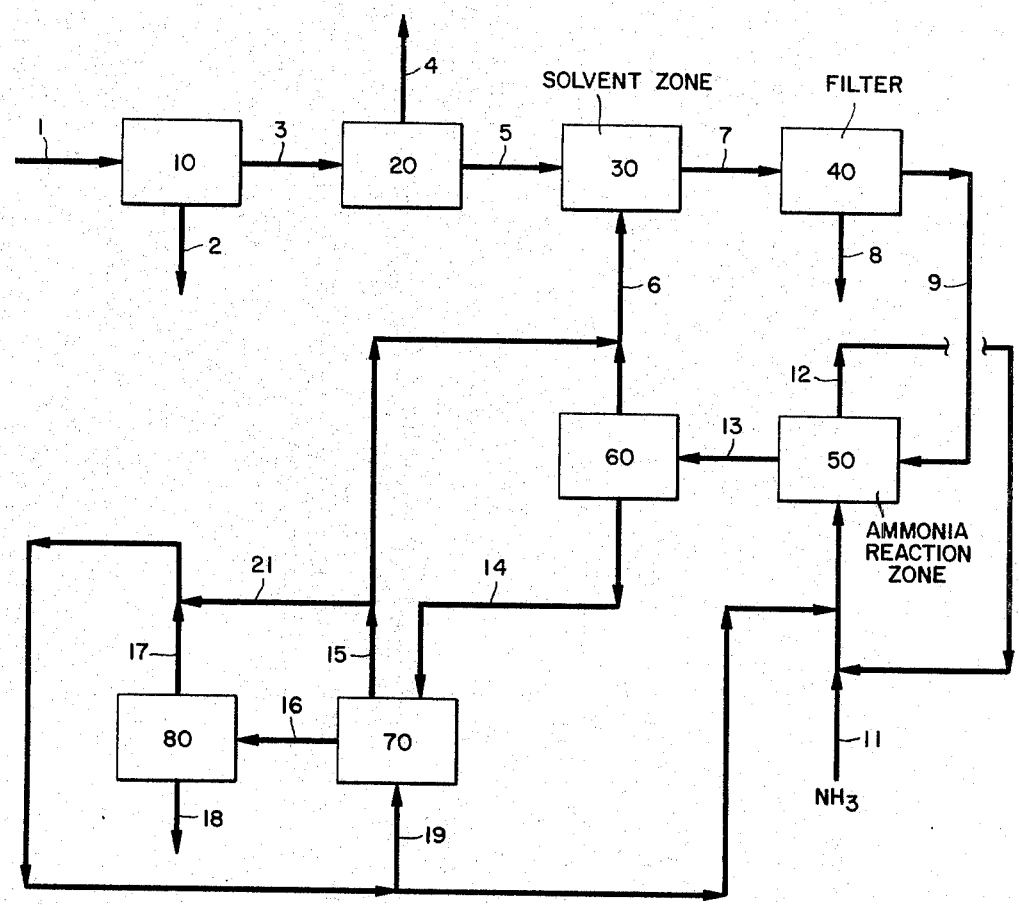
CHARLES NEWTON KIMBERLIN, JR.
FRED J. BUCHMANN       INVENTORS
BY W. O. T. Heilman
PATENT ATTORNEY

United States Patent Office 3,341,282
Patented Sept. 12, 1967

3,341,282
DEHYDRATION MAGNESIUM CHLORIDE UTILIZING ALCOHOL SOLUTION AND AMMONIA
Charles Newton Kimberlin, Jr., and Fred J. Buchmann, Baton Rouge, La., assignors to Esso Research and Engineering Company, a corporation of Delaware
Filed Apr. 14, 1965, Ser. No. 448,220
9 Claims. (Cl. 23—91)

ABSTRACT OF THE DISCLOSURE

Carnallite is dehydrated by roasting, followed by dissolving the magnesium chloride in a solvent preferably an alcohol, impurities including potassium chloride being removed by filtering. The magnesium is precipitated in the solvent by the formation of the ammoniate using gaseous ammonia; the major portion of the solvent is removed by filtering; the final traces of the solvent are thereafter removed utilizing additional gaseous ammonia; then the ammoniate is decomposed to secure anhydrous magnesium chloride.

---

The present invention is broadly concerned with the purification and dehydration of magnesium chloride so as to produce anhydrous magnesium chloride which may be further processed as, for example, by means of an electrolytic cell. The invention is specifically concerned with a technique for the dehydration of magnesium chloride utilizing a plurality of integrated processing zones wherein the last traces of water are removed.

The present invention is particularly concerned with the production of anhydrous magnesium chloride from carnallite. In accordance with the present invention, carnallite ($KCl \cdot MgCl_2 \cdot 6H_2O$) is roasted under conditions to remove the water of hydration. The dehydrated $MgCl_2$ is then extracted with an alcohol, filtered to remove undesirable salts such as potassium chloride, sodium chloride and then contacted with ammonia gas under conditions to precipitate the magnesium chloride ammoniate ($MgCl_2 \cdot 6NH_3$). The magnesium chloride ammoniate is then handled in a manner to regenerate the ammonia to produce a dehydrated magnesium chloride of a very high quality.

It is known in the art that naturally occurring carnallite is a double salt of potassium chloride and magnesium chloride and generally contains associated therewith about 6 molecules of water of hydration ($KCl \cdot MgCl_2 \cdot 6H_2O$), along with salt impurities such as excess potassium chloride, sodium chloride, calcium chloride, and also some sulfates. Naturally occurring carnallite also usually has associated therewith varying amounts of such impurities as sand, clay, gravel and other like minerals.

It is also known in the art that by general dehydration processes it is possible to remove about four molecules of water from $MgCl_2 \cdot 6H_2O$ without securing undesirable side reactions. However, if further dehydration is continued by known techniques in order to remove the remaining two molecules of water, undesirable side reactions occur, such as the formation of magnesium hydroxy chloride, magnesium oxide and hydrochloric acid. This is very undesirable, particularly if the magnesium chloride is to be further processed by electrolysis.

Although, as mentioned above, attempts to completely dehyrate pure magnesium chloride result in undesirable side reactions, the double salts of magnesium chloride such as carnallite ($KCl \cdot MgCl_2 \cdot 6H_2O$) are very easily dehydrated without undesired side reactions by simple heating. However, the product of this dehydration is a mixture of anhydrous magnesium chloride and potassium chloride along with the other salt and mineral impurities that were present in the original carnallite. In general, such mixtures contain too many impurities to be useful as a cell feed for the production of magnesium metal and it has not heretofore been possible to separate these from pure anhydrous magnesium chloride.

It has now been discovered that, if a plurality of interrelated stages or reaction zones are employed which utilize the technique of heating the carnallite ore, followed by preparing a solution of the dehydrated magnesium chloride in a nonaqueous solvent, followed by the precipitation of the magnesium chloride with ammonia, an excellent dehydrated, high-quality magnesium chloride product is secured.

The present invention may be more fully understood by reference to the drawing illustrating one embodiment of the same. Referring specifically to the drawing, carnallite as mined is introduced into a concentration zone 10 by means of line 1. The ores mined contain, in addition to carnallite, other impurities such as gangue, clay, sand, etc. Conventional techniques may be used in zone 10 in order to remove these undesirable materials which are separated by means of line 2. A relatively concentrated carnallite ore is removed from zone 10 by means of line 3 and introduced into a roasting zone 20. The carnallite ore removed by means of line 3 contains water of hydration along with impurities such as excess potassium chloride, sodium chloride, calcium chloride, sulfates and the like. Some clay and sand also still remain associated with the carnallite.

The ore in roasting zone 20 is subjected to a temperature in the range from about 300° F. to 700° F. preferably about 600° F. and a pressure of about atmospheric. The time of residence of the carnallite in zone 20 is in the range of from 30 to 180 minutes preferably about 60 minutes. Under these conditions the water of hydration is removed and is separated as a vapor by means of line 4. The dehydrated magnesium chloride containing associated therewith potassium chloride, sodium chloride, etc. is removed from roasting zone 20 by means of line 5, cooled, and then introduced into zone 30 where the same is contacted with a solvent, preferably an alcohol solvent, to dissolve the magnesium chloride. The amount of impurities associated with the magnesium chloride which is introduced into zone 30 is usually in the range from about 50% to 90% by weight. A solvent such as butyl or isoamyl alcohol is introduced into zone 30 by means of line 6. Other satisfactory solvents are, for example, alcohols containing from about 3 to 8 carbon atoms such as hexyl alcohol, octyl alcohol. Low molecular weight ketones containing from about 3 to 8 carbon atoms such as methyl isobutyl ketone may also be used as a solvent. Mixtures of these solvents may also be used.

The temperature maintained in zone 30 is in the range from about 140 to 250° F., preferably about 200° F. The pressure maintained in zone 30 is in the range of from 0 to 30 p.s.i.g., preferably about 10 p.s.i.g. Under these conditions the impurities such as potassium chloride and sodium chloride are not dissolved in the solvent. Effluent from zone 30 is passed into a filtering zone 40 by means of line 7 wherein suitable means are utilized to separate the insoluble impurities from the solution which impurities are removed by means of line 8. The concentration of magnesium chloride in the solvent as, for example, in butyl alcohol, is in the range from 5 to 25% by weight, preferably about 15% by weight.

The solution of magnesium chloride in solvent is removed from filtering zone 40 by means of line 9 and introduced into an ammonia reaction zone 50. In zone 50 the solution of magnesium chloride is contacted with ammonia, preferably gaseous, which is introduced by means of line 11. The temperature in zone 50 is in the range from about 140 to 250° F. preferably about 200° F.

The pressure in zone 50 is in the range from about 0 to 30 p.s.i.g., preferably about 10 p.s.i.g. Unreacted ammonia is removed from zone 50 by means of line 12 and preferably recycled to the system. Under these conditions, ammonia reacts with the magnesium chloride to form an insoluble magnesium chloride ammoniate precipitate ($MgCl_2 \cdot 6NH_3$). The stream containing the precipitate is removed from zone 50 by means of line 13 and introduced into a second filter zone 60 where suitable means are used to separate the insoluble magnesium chloride ammoniate from the solvent. The solvent is removed by means of line 6 and preferably recycled to the system while the insoluble precipitate is removed by means of line 14. This precipitate is passed to zone 70 wherein the last traces of solvent are removed by means of line 15 and recycled to the system. It is very important to remove the last traces of the solvent in zone 70. This separation of the last traces of solvent in zone 70 is secured by contacting the precipitate with a stream of ammonia gas which is introduced by means of line 19, which gas is heated at a temperature of about 200° to 450° F., preferably about 300° F. to evaporate the solvent adhering to the precipitate.

The last traces of solvent and ammonia removed by means of line 15 from drying zone 70 are handled by suitable means to separate the solvent which is preferably recycled to zone 30 by means of line 6 and into ammonia which is segregated by means of line 21 and preferably recycled to the system. A preferred adaptation is to use a conventional fluid bed in zone 70 wherein the hot ammonia gas functions as a fluidizing medium. However, a kiln or rotating reactor may also be used.

The solid magnesium chloride ammoniate ($MgCl_2 \cdot 6NH_3$) is passed into a secondary reaction zone or decomposing zone 80 by means of line 16. Temperature and pressure conditions in zone 80 are adjusted so as to separate the ammonia as a vapor by means of line 17 which is preferably recycled to the system. A dehydrated magnesium chloride is removed from decomposing zone 80 by means of line 18 and further processed as desired, preferably by means of an electrolytic cell. The temperature in secondary reaction zone 80 is maintained in the range from about 500 to 1000° F., preferably about 750° F., while the pressure is in the range of from 0.1 to 4 atmospheres, preferably about 1 atmosphere.

Thus, the present process starts with carnallite, $KCl \cdot MgCl_2 \cdot 6H_2O$, either pure or impure, or with similar hydrated true double salts of $MgCl_2$. These double salts are dehydrated without hydrolysis by heating at temperatures from 300 to 700° F., preferably from 400 to 500° F. The anhydrous $MgCl_2$ thus formed is extracted with an anhydrous solvent to separate the $MgCl_2$ from the KCl or other inorganic salts by any of several dry organic solvents such as alcohols, low molecular weight ketones, etc. Preferred alcohols are those having 4 to 6 carbon atoms. The solution is filtered to separate insoluble impurities. The anhydrous $MgCl_2$ is then converted to $MgCl_2 \cdot 6NH_3$ by introducing dry $NH_3$ into the hot alcohol solution (10–50° F. below the boiling point). The precipitate $MgCl_2 \cdot 6NH_3$ is then filtered and it is quite important to remove all traces of alcohol. This is preferably done by heating the $MgCl_2 \cdot 6NH_3$ in a stream of dry $NH_3$ at about 250° to 450° F. preferably about 300 to 400° F. possibly in a fluid bed or a rotating reactor or kiln. The precipitate is then decomplexed into ammonia and a high quality anhydrous magnesium chloride.

What is claimed is:

1. Process for the production of high quality anhydrous magnesium chloride from carnallite which comprises heating the carnallite in a roasting zone under temperature and pressure conditions to remove the water of hydration therefrom, thereafter dissolving the dehydrated magnesium chloride in a solvent, filtering the solution to remove undissolved impurities including potassium chloride therefrom, treating the solution in an initial reaction zone with ammonia gas under conditions to precipitate magnesium chloride ammoniate, separating the precipitate from the solvent, passing the precipitate in a drying zone to remove the last traces of solvent therefrom by treatment with additional ammonia gas, then subjecting the dried magnesium chloride ammoniate in a secondary reaction zone to conditions to decompose the same into ammonia and into a high-quality, anhydrous magnesium chloride product.

2. Process as defined by claim 1 wherein the temperature in said roasting zone is in the range from about 300° F. to about 700° F. and wherein said solvent is selected from the class consisting of low boiling alcohols and low boiling ketones.

3. Process as defined by claim 2 wherein said dehydrated magnesium chloride is dissolved in said solvent at a temperature in the range from about 140° F. to about 250° F.

4. Process as defined by claim 1 wherein the temperature in said initial reaction zone is in the range from about 140° F. to about 250° F.

5. Process as defined by claim 1 wherein said precipitate is dried in said drying zone by the use of gaseous ammonia at a temperature in the range from about 200° F. to about 450° F.

6. Process as defined by claim 5 wherein said precipitate is dried by said ammonia in a fluid bed wherein said fluidizing gas comprises ammonia.

7. Process as defined by claim 3 wherein the temperature in said secondary reaction zone is in the range from about 500° F. to about 1000° F.

8. Process for the production of a high quality, anhydrous magnesium chloride from carnallite which comprises heating the carnallite in a roasting zone at a temperature in the range from about 300° F. to about 700° F. to remove the water of hydration therefrom, thereafter dissolving the dehydrated magnesium chloride in a low boiling alcohol solvent at a temperature in the range from about 140° F. to 250° F., filtering the solution to remove undissolved impurities therefrom including potassium chloride, thereafter contacting the solution in an initial reaction zone with gaseous ammonia at a temperature of about 140° F. to 250° F. to form an insoluble magnesium chloride ammoniate, separating the precipitate from the solvent, removing the last traces of solvent from the precipitate in a drying zone at a temperature in the range from about 200° F. to 450° F. by treatment with additional gaseous ammonia, thereafter passing the dried precipitate to a secondary reaction zone and decomplexing the same to ammonia and anhydrous magnesium chloride.

9. Process as defined by claim 8 wherein said precipitate is dried in said drying zone utilizing gaseous ammonia.

References Cited

UNITED STATES PATENTS

| | | | |
|---|---|---|---|
| 1,875,013 | 8/1932 | Kaselitz | 23—91 X |
| 1,903,592 | 4/1933 | Lacell | 23—91 |
| 2,381,994 | 8/1945 | Belchetz | 23—91 |
| 2,381,995 | 8/1945 | Belchetz | 23—91 |
| 3,092,450 | 6/1963 | Christensen et al. | 23—91 |
| 3,181,930 | 5/1965 | Olsen | 23—91 |

FOREIGN PATENTS

| | | |
|---|---|---|
| 255,042 | 4/1927 | Great Britain. |

OTHER REFERENCES

Jour. Indian Chem. Soc., Ind. & News Ed., vol. 14, Nos. 3 and 4, 1951, p. 171.

OSCAR R. VERTIZ, *Primary Examiner.*

EDWARD STERN, *Examiner.*